United States Patent
Cernohous et al.

(10) Patent No.: US 9,056,980 B2
(45) Date of Patent: Jun. 16, 2015

(54) FLAME RETARDANT COMPOSITIONS

(75) Inventors: Jeffrey Jacob Cernohous, Hudson, WI (US); Adam R. Pawloski, Lake Elmo, MN (US); Kent A. Kaske, Woodbury, MN (US); David Geraint Roberts, Sheboygan Falls, WI (US)

(73) Assignee: SACO POLYMERS, INC., Sheboyan, WI (US)

( * ) Notice: Subject to any disclaimer, the term of this patent is extended or adjusted under 35 U.S.C. 154(b) by 74 days.

(21) Appl. No.: 13/983,221

(22) PCT Filed: Feb. 3, 2012

(86) PCT No.: PCT/US2012/023702
§ 371 (c)(1),
(2), (4) Date: Feb. 25, 2014

(87) PCT Pub. No.: WO2012/106563
PCT Pub. Date: Aug. 9, 2012

(65) Prior Publication Data
US 2014/0163171 A1    Jun. 12, 2014

Related U.S. Application Data

(60) Provisional application No. 61/439,609, filed on Feb. 4, 2011.

(51) Int. Cl.
| | |
|---|---|
| *C08K 5/07* | (2006.01) |
| *C08G 63/08* | (2006.01) |
| *C08L 85/02* | (2006.01) |
| *C08F 283/00* | (2006.01) |
| *C08L 61/06* | (2006.01) |
| *C08L 67/04* | (2006.01) |
| *C09K 21/14* | (2006.01) |
| *C08K 9/06* | (2006.01) |
| *C08L 81/02* | (2006.01) |
| *C08L 23/02* | (2006.01) |

(52) U.S. Cl.
CPC ............... *C08L 67/04* (2013.01); *C09K 21/14* (2013.01); *C08K 9/06* (2013.01); *C08L 81/02* (2013.01); *C08L 23/02* (2013.01)

(58) Field of Classification Search
CPC .......... C09K 21/14; C09K 9/06; C08L 81/02; C08L 23/02; C08L 67/04; C08L 85/02
USPC ............................ 525/164, 538, 509, 450, 188
See application file for complete search history.

(56) References Cited

U.S. PATENT DOCUMENTS

| | | |
|---|---|---|
| 6,627,122 B1 | 9/2003 | Tada et al. |
| 7,713,891 B1 | 5/2010 | Li et al. |
| 8,012,891 B2 | 9/2011 | Li et al. |
| 2006/0276595 A1 | 12/2006 | Baran, Jr. et al. |

FOREIGN PATENT DOCUMENTS

| | | | |
|---|---|---|---|
| EP | 2 337 892 B1 | * | 10/2013 |
| KR | 10-2008-0112840 A | | 12/2008 |

OTHER PUBLICATIONS

English translation of abstract of JP 64-73651, Minoru et al. Mar. 1989.*
Gao et. el., Polymer Degradation and Stability, vol. 93, 1308-1315 (2008).
International Search Report regarding PCT/US2012/023702, dated Sep. 24, 2012, 3 pages.
Rose et al., Journal of Volcanology and Geothermal Research, 186 (1-2): 32-39 (2009).
Toldy et al., Polymer for Advanced Technologies, vol. 17, 778-781 (2006).

* cited by examiner

*Primary Examiner* — William Cheung
(74) *Attorney, Agent, or Firm* — Foley & Lardner LLP

(57) ABSTRACT

A substrate having a flame retardant polymer chemically bonded to at least a portion of the substrate. The use of a substrate possessing at least a partially coated outer surface of a flame retardant polymer enables the manufacturing of polymer composites, containing the coated substrate, that possess very effective flame retardant performance while reducing the loading levels over conventional flame retardant additives.

31 Claims, No Drawings

FLAME RETARDANT COMPOSITIONS

This US National Stage application claims priority PCT application no. PCT/US12/23702, filed Feb. 3, 2012, which claims benefit of U.S. Provisional application no. 61/439,609 filed Feb. 4, 2011, whose disclosure is incorporated herein by reference.

TECHNICAL FIELD

The present invention relates to a flame retardant composition. Specifically, the present invention is a combination of a substrate, or carrier particle, and a flame retardant polymer bonded to the substrate.

BACKGROUND

Polymer composites are widely utilized in numerous applications, including automotive, home construction, electronic and consumer good products. One frequent requirement of polymer composites in certain applications is that they must be flame retardant. In order to prevent polymers from burning, the propagation of the combustion cycle has to be stopped.

There are various strategies for combating the fire chemically and physically in both the vapor phase and condensed phase. When a polymer breaks down there are many pathways in which the polymer can decompose to form high-energy free radicals. In the vapor phase, the combustion cycle can be stopped by physically diluting the flame with non-combustible gases and chemically capping the high-energy free radicals. In the condensed phase, two methods are generally utilized to stop the combustion: (i) formation of char, which adds a protective layer between the flame front and the polymer fuel, and (ii) dilution of solid fuel with inorganic fillers that decompose to dilute the flame.

The most widely utilized flame retardants on the market today are halogenated flame retardant additives. The halogenated flame retardant retard the flame efficiently by acting quickly as a radical trap that catalytically stops the fire by capping the high-energy free radicals in the vapor phase. This effectively stops the combustion cycle and extinguishes the flame. Halogenated flame retardants, however, may evolve harmful gases and can have a negative effect on the environment. For that reason, other approaches for extinguishing flames in polymeric compounds have been sought.

Conventional flame retardant additives are various organic and inorganic compounds that are blended with commercially available polymers to impart flame retardant properties within the polymer. The conventional additives may employ vapor phase or condensed phase methods for arresting the flames. The addition of conventional flame retardant materials to a polymer composition may adversely impact the physical characteristics of the composition, ultimately rendering the composition unsuitable or undesirable for its intended purpose. Highly filled flame retardant polymers often have inferior physical characteristics compared to competitive materials due to their molecular architecture. Such materials are often incapable of achieving the desired strength and impact characteristics. Other flame retardant compositions offer molecular architecture that potentially limits the subsequent processing once the multi-component composition is created.

SUMMARY OF THE INVENTION

The composition disclosed herein is a substrate having a flame retardant polymer chemically bonded to at least a portion of the substrate. The article is suitable as an additive in polymeric composites. The flame retardant polymer is capable of arresting flames in polymeric composites. In some embodiments, the use of a substrate possessing at least a partially coated outer surface of a flame retardant polymer enables very effective flame retardant performance while reducing the loading levels over conventional flame retardant additives. It is believed that the efficacy of the articles as flame retardant materials is a factor of the enhanced ratio of mass to surface area resulting from the application of the flame retardant material onto the substrate. In that regard, the mass of flame retardant has greater exposure than a single flame retardant particle of the same mass. Additionally, polymer composites employing a substrate having a flame retardant polymer chemically bonded to at least a portion of the substrate possess desirable mechanical properties.

In certain embodiments, the composition is formed by polymerizing a monomer with flame retardant constituents in the presence of a multifunctional coupling agent and a substrate to form a flame retardant polymer chemically bonded to the substrate. In one embodiment, the polymer is crosslinked. Additionally, in another embodiment, the monomer may contain a phosphorus compound as a flame retardant constituent. The composition may then be employed as a flame retardant additive in a polymeric matrix.

The flame retardant compositions are capable of arresting or stopping flame propagation in polymeric materials. For example, certain embodiments exhibit either V0 or V2 test results under the UL94 test procedures. The substrate, with at least a partial coating of the flame retardant polymer, is well suited for forming composites with polymeric materials. In certain embodiments, the composite is formed using melt processing techniques. The composites are suitable for manufacturing articles in the construction, electronics, consumer goods and automotive industries.

For purposes of the present invention, the following terms used in this application are defined as follows:

"Chemically Bonded" means any of several forces, including ionic bonds, covalent bonds, and metallic bond, by which atoms or ions are bound.

"Composite" means a mixture of a polymeric material and an additive or filler, such as the flame retardant article set forth in the disclosure.

"Crosslinked" means covalent or ionic bonds that connect polymer chains together.

"Flame Retardant Composition" means a composition that can reduce, arrest or retard the material's tendency to burn.

"Melt Processable Composition" means a formulation that is melt processed, typically at elevated temperatures, by means of a conventional polymer processing technique such as extrusion or injection molding as an example.

"Melt Processing Techniques" means extrusion, injection molding, blow molding, rotomolding, or batch mixing.

The above summary of the present invention is not intended to describe each disclosed embodiment or every implementation of the preset invention. The detailed description that follows more particularly exemplifies illustrative embodiments.

DETAILED DESCRIPTION

A flame retardant composition is formed by chemically bonding a flame retardant polymer to at least a portion of a substrate. The composition is suitable as a flame retardant additive in polymeric matrices.

The substrate may be any material that is capable of receiving a flame retardant polymeric material. In one aspect, the substrate may be volcanic ash, microspheres, glass fibers, silicates, metal oxides, minerals, or clay. In one embodiment, the substrate is a particle of up to 100 microns. In other embodiments, the size of the selected substrate may vary between 50 nm to 5 microns.

The substrate, upon application of the polymeric coating, is intended as an additive or filler in a polymeric matrix. In that regard, the sizing, shape and specific type of substrate are selected to achieve a desired result in a specific composite material. One of ordinary skill in the art is capable of selecting a specific substrate for a given application.

Additionally, surface modification of the substrate may be used to assist in the formation of chemical bonds with the flame retardant polymer. Non-limiting examples of surface modification include silane modification and plasma modification. Surface modification may include the application of a multifunctional coupling agent. For example, the multifunctional coupling agent may have at least one of silanol, methoxy, ethoxy or amino functional groups that bonds with the substrate and at least one of methoxy, ethoxy or amino functional groups that bonds with the flame retardant polymer. The functional groups that bond with the flame retardant polymer may be a reactive component capable of producing chemical bonds with the flame retardant polymer.

In one embodiment, a silane with a pendant amine group is well suited as a multifunctional coupling agent. The surface modification may be a precursor step in the formation of the flame retardant polymer coating. Conventional surface modification techniques are generally known by those of ordinary skill in the art. In some embodiments, solution phase coating techniques, utilizing a slurry of the intended substrates with silane, may be employed.

A monomer with a flame retardant constituent, or a combination of monomers with at least one having a flame retardant constituent, are polymerized onto the substrate to form the flame retardant polymer. The flame retardant constituent of the polymer may include, for example, halogen or non-halogen components. The flame retardant constituent becomes part of the polymer network during polymerization. The polymerization of the monomer in the presence of the substrate results in at least a partial coating on the substrate. The coating thickness may vary from less than 1 nm to about 1 micron.

Phosphorus compounds are one non-limiting example of a flame retardant constituent. For example suitable phosphorus compounds include tetrakis(hydroxymethyl)phosphonium salts or a precondensate of tetrakis(hydroxymethyl)phosphonium salt with urea. Eccoshield FR 101 from Eastern Color & Chemical Company (Providence, R.I.) is one example of a monomer with a phosphorus constituent that is suitable for forming a polymer on the substrate. The phosphorus compounds are generally included from 5 to 95% by weight.

In one aspect, the flame retardant polymer forms a crosslinked network. The crosslinking takes place in the presence of a crosslinking agent during the polymerization and formation of the flame retardant polymer. Ammonia, ammonium hydroxide, melamine, and melamine precursors are all non-limiting example of crosslinking agents suitable for forming the crosslinked network. Melamine and melamine precursors include Eccoresin M-300 from Eastern Color & Chemical Company (Providence, R.I.). In certain embodiments, the crosslinking agents possess the additional benefit of imparting flame retardant properties to the polymer. For example, several crosslinking agents may result in additional nitrogen in the polymer. Catalysts, such as magnesium chloride, may also be optionally employed with the crosslinking agents.

The flame retardant polymers applied onto a substrate may exhibit enhanced flame retardant properties or reduce the overall amount of flame retardant material needed in a polymer in order to prevent or arrest flame propagation. This artifact is partly due to the mass to surface area ratio resulting from the application of the flame retardant material onto the substrate. In that regard, the mass of flame retardant has greater exposure than a single flame retardant particle of the same mass. In some embodiments with both phosphorus and nitrogen present, the compounds possess a synergistic flame retardant effect.

In one alternative embodiment, a multifunctional coupling agent is used to assist in bonding the flame retardant polymer to the substrate. The multifunctional coupling agent contains chemically functional groups that are capable of producing chemical bonds with both the substrate and the flame retardant polymer. Functional groups include those formed from amines, carboxylic acids, alcohols, esters, anhydrides, epoxides, and unsaturated hydrocarbons. In one embodiment, a minimum of two types of functional groups exist on the multifunctional coupling agent. In a second embodiment, the type of functional group that chemically bonds to the substrate is also capable of chemically bonding with the flame retardant polymer, thus two functional groups of the same type may chemically bond with both substrate and flame retardant polymer. In a third embodiment, the multifunctional coupling agent is a monomer, capable of polymerization with the flame retardant polymer and chemically bonding with the substrate. Those of ordinary skill in the art recognize that selected components and reaction conditions may require different functional groups or process conditions, such as temperature, concentration, pH, use of catalyst, and the like.

In an alternative embodiment, the phosphorus compound may be oxidized. The oxidation of the phosphorus compound present in the flame retardant polymer may be oxidized to a different oxidation state using, for example, hydrogen peroxide. The oxidation of the phosphorus compound controls odors of the final product, increases flame retardant efficiency, and provides additional heat stability within the polymer.

The flame retardant component may be produced by polymerizing a monomer, having flame retardant constituents, in the presence of a multifunctional coupling agent. The flame retardant polymer is then chemically bonded to the substrate through chemical bonds produced by the multifunctional coupling agent. In another embodiment, the surface of a substrate is first modified with a multifunctional coupling agent, such as a silane compound. The flame retardant monomer is then polymerized in the presence of both a substrate and a crosslinking agent to form a crosslinked flame retardant polymer. The resulting polymer is chemically bonded to the substrate. The resulting polymer bonded to the substrate may then be subjected to an oxidation step in order to oxidize the phosphorus component of the polymer.

The substrate with the flame retardant polymer bonded to it is well suited for dispersion into a polymeric matrix to produce a composite. The matrix may include various materials that can accept the flame retardant composition. Non-limiting examples of polymers and copolymers include vinyl polymers, polyolefins, polyesters, polyacrylates, polyamides, polycarbonates, polyurethanes, polysaccharides, melamine resins, phenolic resins, silicones, epoxies, and rubbers. The composition could be used as a flame retardant in any thermoplastic or thermoset resin that processes below the decomposition temperature of the flame retardant.

In another aspect of the invention, the melt processable composition may contain other additives. Non-limiting examples of conventional additives include plasticizers, antioxidants, light stabilizers, fibers, blowing agents, foaming additives, antiblocking agents, heat stabilizers, impact modifiers, biocides, compatibilizers, tackifiers, colorants, coupling agents, and pigments. The additives may be incorporated into the melt processable composition in the form of powders, pellets, granules, or in any other extrudable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

The melt processable compositions may be prepared by any of a variety of ways using melt processing techniques. For example, the flame retardant composition, the optional additives, and the polymeric matrix can be combined together by any of the blending means usually employed in the plastics industry, such as with a compounding mill, a Banbury mixer, or a mixing extruder. The materials may be used in the form, for example, of a powder, a pellet, or a granular product. The mixing operation is most conveniently carried out at a temperature above the melting point or softening point of the polymer. The resulting melt-blended mixture can be either extruded directly into the form of the final product shape or pelletized or otherwise comminuted into a desired particulate size or size distribution and fed to an extruder that melt-processes the blended mixture to form the final product shape. Alternatively, the composition may be molded into a desired form. The resulting composite exhibits superior performance results when produced using this protocol.

In another embodiment, the flame retardant compound is melt processed with the polymer to form a masterbatch. The masterbatch is then let down to the desired level of flame retardant additive in a subsequent melt processing step. This two step process can have the effect of improving the dispersion of the flame retardant additive and the chemical and mechanical properties of the final compound. Those skilled in the art of melt processing polymer compositions are capable of selecting processing steps to achieve a desired level of intermixed components.

Melt-processing typically is performed at a temperature from 80° to 300° C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 11-33, 2001.

The composites of this invention are suitable for manufacturing articles in the construction, electronics, wire and cable, consumer goods and automotive industries. For example, articles incorporating the composition of the present invention may include: molded architectural products, forms, automotive parts, building components, household articles, or electronic hard goods.

The resulting articles produced by melt processing the materials exhibit superior flame retardant characteristics. The composite of polymer and flame retardant composition exhibits self extinguishing properties under UL 94 test procedures. In certain embodiments, the composite has a rating of V0, V1, or V2 on the UL 94 vertical flame retardant test. A polymer with the flame retardant composition is capable of achieving a Class1/A rating under the ASTM E84-08 test or the comparable ANSI/UL 723 test.

EXAMPLES

TABLE 1

Materials used to generate the following examples include:

| Material | Description |
| --- | --- |
| Volcanic Ash | Dry micronized and expanded volcanic ore, commercially available from Kansas Minerals Inc. (Mankota, KS) |
| Z-6137 | Aminoethylaminopropylsilane triol homopolymer from Dow Corning (Midland, Michigan) |
| Z-6011 | Aminopropyltriethoxysilane from Dow Corning (Midland, Michigan) |
| Z-6697 | Tetraethyl orthosilicate from Dow Corning (Midland, Michigan) |
| PYROSET TKC | Tetrakis(hydroxymethyl)phosphonium chloride from Cytec Industries Inc. (Woodland Park, New Jersey) |
| PYROSET TPC | Precondensate of urea and tetrakis(hydroxymethyl)phosphonium chloride from Cytec Industries Inc. (Woodland Park, New Jersey) |
| ECCOSHIELD FR-101 | Tetrakis(hydroxymethyl)phosphonium sulfate from Eastern Color & Chemical Company (Providence, Rhode Island) |
| ECCORESIN M-300 | Melamine/Formaldehyde resin solution from Eastern Color & Chemical Company (Providence, Rhode Island) |

Example 1

Silanation of Volcanic Ash

A total of 500 grams of volcanic ash was mixed with 1 liter of a 4% Z-6137 silane solution in water and left to stir overnight. The ash was filtered with a Buchner funnel, rinsed with water and left to air-dry.

Example 2

Silanation of Volcanic Ash

A total of 500 grams of volcanic ash was mixed with 1 liter of solution containing 4% Z-6011 silane, 20% acetone, and 76% water by weight and left to stir overnight. The ash was filtered with a Buchner funnel, rinsed with water and left to air-dry.

Example 3

Silanation of Volcanic Ash

A total of 500 grams of volcanic ash was mixed with 1 liter of solution containing 4% Z-6697 silane, 20% acetone, and 76% water by weight and left to stir overnight. The ash was filtered with a Buchner funnel, rinsed with water and left to air-dry.

Example 4

Formation of a Flame Retardant Polymer on Volcanic Ash

A total of 150 grams of silanated volcanic ash from Example 1 was mixed with 700 grams of PYROSET TPC and 1400 grams of water. A total of 950 mL of 7.0 N ammonia in methanol solution was then added to the mixture in different concentration levels at a rate of 1 to 2 mL per minute while continuously stirring at room temperature. The following indicates the specifics on each aliquot:

Aliquot #1: 75 mL of 7.0 N ammonia solution diluted to 300 mL with water (1.75N ammonia solution).
Aliquot #2: 100 mL of 7.0 N ammonia solution diluted to 300 mL with water (2.33N ammonia solution).
Aliquot #3: 100 mL of 7.0 N ammonia solution diluted to 250 mL with water (2.8N ammonia solution).
Aliquot #4 +5: 150 mL of 7.0 N ammonia solution diluted to 300 mL with water (3.5N ammonia solution).
Aliquot #6: 150 mL of 7.0 N ammonia solution diluted to 250 mL with water (4.2N ammonia solution).
Aliquot #7: 150 mL of 7.0 N ammonia solution diluted to 200 mL with water (5.25N ammonia solution).
Aliquot #8: 75 mL of 7.0 N ammonia solution.

The material was filtered and rinsed with water during filtering. The powder was transferred to a gallon vessel, and approximately 1250 mL of a 3% hydrogen peroxide solution in water was added and the mixture and stirred for more than one hour. The oxidation process was exothermic. An additional 450 mL of 30% hydrogen peroxide solution in water was then added to the slurry and was left stirring for 24 hours. The material was then filtered, rinsed with water, and allowed to air dry. After the material was dry to the touch, it was placed in an oven at 110° C. to dry until the moisture content was below 1% by weight. The process resulted in the recovery of 200 grams of flame retardant polymer coated onto 150 grams of volcanic ash.

Example 5

Formation of a Flame Retardant Polymer on Volcanic Ash

A total of 200 grams of silanated volcanic ash from Example 1 was mixed with 1250 grams of PYROSET TKC and 100 grams of water. A total of 825 mL of 30% ammonium hydroxide solution in water was added in different concentration levels at a rate of 1 to 2 mL per minute. The following indicates the specifics on each aliquot:

Aliquot #1: 100 mL ammonium hydroxide solution diluted to 300 mL with water
Aliquot #2: 100 mL ammonium hydroxide solution diluted to 300 mL with water
Aliquot #3: 100 mL ammonium hydroxide solution diluted to 300 mL with water
Aliquot #4: 150 mL ammonium hydroxide solution diluted to 300 mL with water
Aliquot #5: 150 mL ammonium hydroxide solution diluted to 250 mL with water.
Aliquot #7: 225 mL ammonium hydroxide solution.

The material was filtered and rinsed with water during filtering. The powder was transferred into a gallon vessel and approximately 1250 mL of 3% hydrogen peroxide solution in water was added to the mixture and stirred for more than one hour. The oxidation process was exothermic. An additional 450 mL of 30% hydrogen peroxide solution in water was then added to the slurry and the material left stirring for 24 hours. The material was then filtered, rinsed with water, and allowed to air dry. After the material was dry to the touch, it was placed in an oven at 110° C. to dry until the moisture content was below 1% by weight. The process resulted in the recovery of 200 grams of flame retardant polymer coated onto 200 grams of volcanic ash.

Example 6

Formation of a Flame Retardant Polymer on Volcanic Ash

A total of 200 grams of silanated volcanic ash from Example 1 was mixed with 235 grams of ECCOSHIELD FR-101 and 35 grams ECCORESIN M-300. A total of 180 grams of water was added to the mixture and stirred. About 2 grams of magnesium chloride was then added. The entire mixture was heated on a hot plate at 95° C. while stirring until the material formed a putty like mixture. The material was removed and placed in an oven at 110° C. until all the water evaporated and the material possessed the consistency of a dry, hard solid material. The solid material was ground to a fine powder with a laboratory grinder. The powder was transferred into a gallon vessel and approximately 1250 mL of 3% hydrogen peroxide solution in water was added to the mixture and stirred for more than one hour in order to oxidize the phosphorus component. The oxidation process was exothermic. To the slurry was added an additional 450mL of 30% hydrogen peroxide solution in water, and the material was stirred for 24 hours. The material was then filtered, rinsed with water, and allowed to air dry. After the material was dry to the touch, it was placed in an oven at 110° C. to dry until the moisture content was below 1% by weight. The process resulted in the recovery of 200 grams of flame retardant polymer coated onto the 200 grams of volcanic ash.

Example 7

Melt Processing of Composite of Thermoplastic Polymer and Flame

Retardant Composition

The flame retardant compositions described in Examples 4, 5, and 6 were individually formed into composites with poly (lactic acid) polymer by melt processing. Pellets of Ingeo 2003D, a commercial poly(lactic acid) polymer from NatureWorks LLC (Minnetonka, Minn.) were dry blended with the flame retardant volcanic ash compositions at various concentrations. The dry blends were fed into the throat of a Leistritz MIC 27 GL/40D twin-screw extruder (Leistritz, Nuremberg, Germany). A constant temperature profile of 180° C. was used for the extruder with a screw speed of 100 rpm. The compositions were extruded into strands, cooled by air on a moving belt, and subsequently pelletized.

Example 8

Flame Testing of Flame Retardant Composites

The compositions produced according to Example 7 were processed into 1.25 cm wide test strips by profile extrusion using a Plasti-corder Digi-system, PL 2200 (C.W. Brabender Instruments Inc., South Hackensack, N.J.). Strips were cut into 15 cm long specimens and subjected to testing for horizontal and vertical flame rating following the procedures outlined in the UL 94 test by Underwriters Laboratories, LLC (Camas, Wash.). Table 2 lists the compositions and test results. As shown in the table, the flame retardant composites described in Examples 4, 5, and 6 were capable of producing ratings of V2 and V0.

TABLE 2

| Example | Wt % of FR Polymer in Comound | Wt % of Inert Substrate | UL94 Horizontal Burn Rating | UL94 Vertical Burn Rating |
| --- | --- | --- | --- | --- |
| Example 4 | 15 | 9.375 | HB | V2 |
| Example 5 | 15 | 9.375 | HB | V0 |
| Example 6 | 15 | 15 | HB | V2 |

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A flame retardant composition comprising a substrate and a flame retardant polymer chemically bonded to at least a portion of the substrate by a multifunctional coupling agent; wherein the flame retardant polymer is derived from a phosphorus compound; and the substrate is a particulate material.

2. A composition according to claim 1, wherein the flame retardant polymer is crosslinked.

3. A composition according to claim 1, wherein the phosphorus compound includes tetrakis(hydroxymethyl)phosphonium compounds, or a precondensate of tetrakis(hydroxymethyl)phosphonium compounds with urea.

4. A composition according to claim 1, wherein the substrate is volcanic ash, glass microspheres, glass fibers, silica, metal oxides, minerals, or clays.

5. A composition according to claim 1, wherein the multifunctional coupling agent contains chemically functional groups formed from one or more of amines, carboxylic acids, alcohols, esters, anhydrides, epoxides, and unsaturated hydrocarbons.

6. A composition according to claim 1, wherein the multifunctional coupling agent has at least one of silanol, methoxy, ethoxy or amino functional groups that bond with the substrate and at least one of methoxy, ethoxy or amino functional groups that bond with the flame retardant polymer.

7. A composition according to claim 1, wherein the flame retardant composition is added to a polymeric matrix to form a composite.

8. A composition according to claim 7, wherein the polymeric matrix includes polymers and copolymers selected from vinyl polymers, polyolefins, polyesters, polyacrylates, polyamides, polycarbonates, polyurethanes, polysaccharides, melamine resins, phenolic resins, silicones, epoxies, rubbers, and combinations thereof 9. A composition according to claim 8, wherein the polymeric matrix includes polyethylene, polyethylene copolymer, polypropylene, and/or polypropylene copolymer.

10. A composite composition, comprising:
(a) a polymeric matrix; and
(b) a substrate having a flame retardant polymer chemically bonded to at least a portion of the substrate by a multifunctional coupling agent; wherein the substrate is a particulate material; the flame retardant polymer is derived from a phosphorus compound; and said substrate is dispersed in the polymeric matrix.

11. The composite composition of claim 10, wherein the flame retardant polymer is bonded to at least a portion of the substrate by a multifunctional coupling agent.

12. A method of producing the flame retardant composition of claim 1, comprising polymerizing a monomer with flame retardant constituents in the presence of the multifunctional coupling agent and the substrate to form a flame retardant polymer chemically bonded to the substrate; wherein the monomer with flame retardant constituents comprises the phosphorus compound.

13. A method according to claim 12, wherein the multifunctional coupling agent contains chemically functional groups formed from one or more of amines, carboxylic acids, alcohols, esters, anhydrides, epoxides, and unsaturated hydrocarbons.

14. A method according to claim 12, further comprising modifying the surface of the substrate before polymerizing using silane modification or plasma modification.

15. A method according to claim 12, wherein the substrate is volcanic ash, glass microspheres, glass fibers, silica, metal oxides, minerals, or clays.

16. A method according to claim 12, further comprising oxidizing the phosphorus compound.

17. A method of producing the flame retardant composition of claim 1 comprising:
(a) modifying the surface of the substrate with the multifunctional coupling agent; and
(b) polymerizing a flame retardant monomer in the presence of the substrate and a crosslinking agent to form a crosslinked flame retardant polymer chemically bonded to the substrate; wherein the flame retardant monomer comprises the phosphorus compound.

18. The composite composition of claim 11, wherein the composite composition is a melt processable composite material; and the substrate is a particulate material having a size of no more than 100 microns.

19. The composite composition of claim 18, wherein the substrate comprises volcanic ash, microspheres, glass fiber, silicate, metal oxide particulate, mineral particulate and/or clay; and the flame retardant polymer is a crosslinked polymer derived from a phosphorus compound.

20. The composite composition of claim 19, wherein the multifunctional coupling agent has at least one of silanol, methoxy, ethoxy or amino functional groups that bond with the substrate and at least one of methoxy, ethoxy or amino functional groups that bond with the flame retardant polymer.

21. The flame retardant composition of claim 1, wherein the substrate is a particulate material having a size of no more than 100 microns.

22. The flame retardant composition of claim 21, wherein the flame retardant polymer is a crosslinked polymer derived from the phosphorus compound; and the substrate comprises volcanic ash, microspheres, glass fiber, silicate, metal oxide particulate, mineral particulate and/or clay.

23. The flame retardant composition of claim 22, wherein the phosphorus compound includes a tetrakis(hydroxymethyl)phosphonium compound, a precondensate of a tetrakis(hydroxy-methyl)phosphonium compound with urea or a combination thereof; and the multifunctional coupling agent is tetraethyl orthosilicate or a silane with a pendant amine group.

24. The flame retardant composition of claim 21, wherein the substrate comprises micronized and expanded volcanic ore.

25. The method of claim 12, further comprising oxidizing the polymer bonded to the substrate to oxidize a phosphorus component of the polymer.

26. A method of producing a melt processable composite composition according to claim 10 comprising:
melt blending a mixture comprising a matrix polymer and a flame retardant composition to provide a dispersion of the flame retardant composition in the matrix polymer.

27. The flame retardant composition of claim 1, wherein the substrate is a particulate material having a size of no more than 100 microns and comprises volcanic ash; the flame retardant polymer is a crosslinked polymer derived from the phosphorus compound; the phosphorus compound includes a tetrakis(hydroxymethyl)phosphonium compound, a precondensate of a tetrakis(hydroxy-methyl)phosphonium compound with urea or a combination thereof; and the multifunctional coupling agent has at least one of silanol, methoxy, ethoxy or amino functional groups that bond with the substrate and at least one of methoxy, ethoxy or amino functional groups that bond with the flame retardant polymer.

28. The composite composition of claim 10, wherein the polymeric matrix includes polyethylene, polyethylene copolymer, polypropylene, and/or polypropylene copolymer and the substrate is a particulate material having a size of no more than 100 microns.

29. A flame retardant composition comprising a substrate and a flame retardant polymer chemically bonded to at least a portion of the substrate by a multifunctional coupling agent; wherein the flame retardant polymer is derived from a phosphorus compound and the multifunctional coupling agent has at least one of silanol, methoxy, ethoxy or amino functional groups that bond with the substrate and at least one of methoxy, ethoxy or amino functional groups that bond with the flame retardant polymer.

30. A flame retardant composition comprising a substrate and a flame retardant polymer chemically bonded to at least a portion of the substrate; wherein the flame retardant polymer is derived from a phosphorus compound;
the flame retardant composition is added to a polymeric matrix to form a composite; and the polymeric matrix includes polyethylene, polyethylene copolymer, polypropylene, and/or polypropylene copolymer.

31. A method of producing a flame retardant composition comprising:
polymerizing a monomer with flame retardant constituents in the presence of a multifunctional coupling agent and a particulate substrate to form a flame retardant polymer chemically bonded to at least a portion of the substrate by the multifunctional coupling agent; wherein the monomer with flame retardant constituents comprises a phosphorus compound; and
modifying the surface of the substrate before the polymerizing step using silane modification or plasma modification.

* * * * *